US007774339B2

(12) United States Patent
White et al.

(10) Patent No.: US 7,774,339 B2

(45) Date of Patent: Aug. 10, 2010

(54) USING SEARCH TRAILS TO PROVIDE ENHANCED SEARCH INTERACTION

(75) Inventors: Ryen W. White, Kirkland, WA (US); Mikhail Bilenko, Bellevue, WA (US); Nicholas E. Craswell, Cambridge (GB); Michael M. Cameron, Redmond, WA (US); Hugh E. Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 11/811,596

(22) Filed: Jun. 11, 2007

(65) Prior Publication Data

US 2008/0306937 A1 Dec. 11, 2008

(51) Int. Cl.
*G06F 17/30* (2006.01)

(52) U.S. Cl. ........................ 707/722; 707/706; 707/707

(58) Field of Classification Search ....................... None
See application file for complete search history.

(56) References Cited

U.S. PATENT DOCUMENTS

| | | | | |
|---|---|---|---|---|
| 6,006,225 | A | 12/1999 | Bowman | 707/5 |
| 6,411,950 | B1 | 6/2002 | Moricz | 707/3 |
| 6,671,681 | B1 | 12/2003 | Emens | 707/5 |
| 6,772,150 | B1 | 8/2004 | Whitman | 707/102 |
| 7,062,475 | B1 | 6/2006 | Szabo et al. | |
| 7,092,936 | B1 | 8/2006 | Alonso | 707/4 |
| 7,136,845 | B2 | 11/2006 | Chandrasekar | 707/5 |
| 7,225,407 | B2 | 5/2007 | Sommerer et al. | |
| 2005/0065774 | A1 | 3/2005 | Doganata | 707/6 |
| 2005/0177569 | A1 | 8/2005 | Bowman | 707/5 |
| 2005/0278317 | A1 | 12/2005 | Gross | 707/3 |
| 2006/0288000 | A1 | 12/2006 | Gupta | 707/3 |
| 2007/0073641 | A1 | 3/2007 | Perry | 707/3 |
| 2009/0030876 | A1 * | 1/2009 | Hamilton | 707/3 |

FOREIGN PATENT DOCUMENTS

WO 2005-069161 A1 7/2005

OTHER PUBLICATIONS

PCT International Search Report Application No. PCT/US2008/065477, Dated Jun. 2, 2008.

Lori Lorigo et al., "Information Processing and Management: an International Journal" vol. 42, Issue 4, Jul. 2006, pp. 1123-1131 ISSN: 0306-4573.

Eugene Agichtein et al., "Learning User Interaction Models for Predicting Web Search Result Peferences" 2006, 8 pages.

Yumiko Seki et al., "User's Behavior and URL Analysis at EC Sites", pp. 87-92, 1999.

Christopher Holscher et al., "Web Search Behavior of Internet Experts and Newbies" http://www.9.org/w9cdrom/81/81.html pp. 1-16 , Jun. 2000.

* cited by examiner

*Primary Examiner*—Baoquoc N To
(74) *Attorney, Agent, or Firm*—Joseph R. Kelly; Westman, Champlin & Kelly, P.A.

(57) ABSTRACT

It has been found that user navigation that follows search engine interactions provides implicit endorsement of resources (such as web resources) that are preferred by users, and which may be particularly valuable for exploratory search tasks. Thus, a combination of past searching and browsing user behavior is analyzed to identify additional information that augments search results delivered by a search engine. The additional information may include a display of hyperlinks to locations which are derived from the past searching and browsing user behavior, given a specific input query. The additional information may be provided to supplement web search results.

16 Claims, 5 Drawing Sheets

USING SEARCH TRAILS TO PROVIDE ENHANCED SEARCH INTERACTION

BACKGROUND

Information retrieval is a process by which a user submits a query to a search engine, and the search engine launches the query against content (or an index of that content) to identify content that is responsive, or otherwise relevant to, the query input by the user. The results returned by the search engine often include hyperlinks to the identified content, in rank order, based on some relevance measure. The results may also include some descriptive material associated with the hyperlink, such as a few phrases from the content.

In an effort to improve information retrieval systems, some work has been done involving alternative query formulations, known as "query suggestions", which are offered to a user following an initial query. The query suggestion allows the user to modify the specification of their informational needs provided to the search engine, which often leads to improved retrieval performance. Some current query suggestion approaches draw upon the query reformulation behavior of other users, to make query recommendations based on previous user interactions with the search engine.

However, this type of interaction-based approach to query suggestion has its limitations. It can be less effective in assisting a user when the information needed by the user is exploratory in nature. This is because a large portion of user activity for such information needs may occur beyond search engine interactions. For instance, in cases where directed searching is only a fraction of users' information-seeking behavior, the utility of users' clicks over the space of top-ranked results may be limited in its effectiveness, because it does not cover the subsequent browsing behavior of those users.

Some browser plug-ins and proxy server logs provide access to the browsing patterns of users that transcend search engine interactions. These data have been used to improve search result ranking, but only did so by considering page visitation statistics independently of one another. It did not take into account the pages' relative positions on post-query browsing paths. Other systems have used this type of information to improve retrieval accuracy by using sequences of consecutive query reformulations. However, this type of system does not consider a user's interactions beyond the reformulation of queries on the search result page.

One system has investigated the possibility of supporting navigation based on the browse trail of other users within a specific domain. This system operated by finding the most popular pages within a given domain. This system simply offers several within-domain shortcuts below the title of a returned search result. The shortcuts appear to be sub-links from a homepage listing, to a set of pages that are directly accessible from that home page listing.

The discussion above is merely provided for general background information and is not intended to be used as an aid in determining the scope of the claimed subject matter.

SUMMARY

It has been found that user navigation that follows search engine interactions provides implicit endorsement of resources (such as web resources) that are preferred by users, and which may be particularly valuable for exploratory search tasks. Thus, a combination of past searching and browsing user behavior is analyzed to identify additional information that augments search results delivered by a search engine. The additional information may include a display of hyperlinks to locations which are derived from the past searching and browsing user behavior, given a specific input query. The additional information may be provided to supplement web search results.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
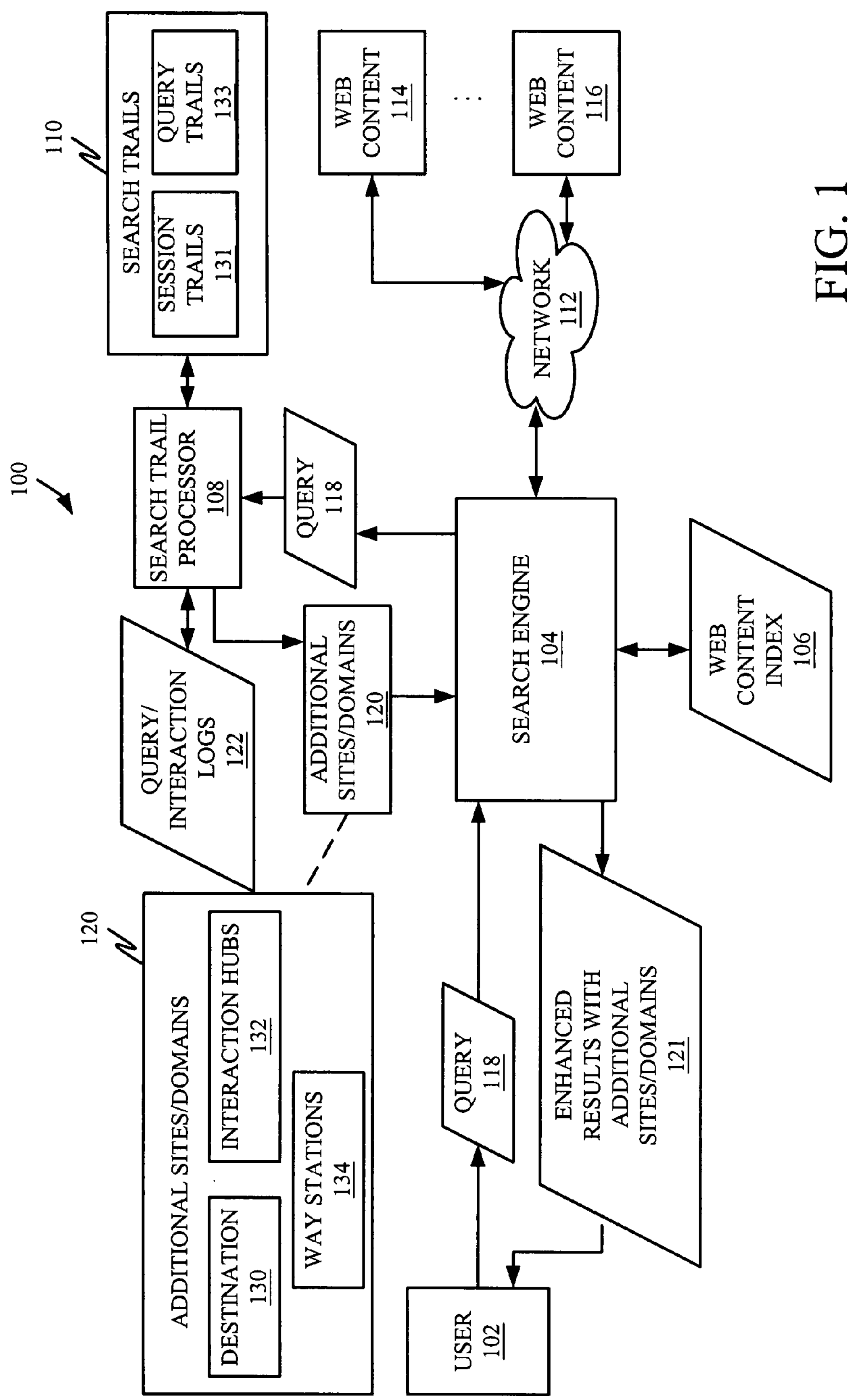
FIG. 1 is a block diagram of one illustrative search system.

FIG. 1 is a block diagram of one illustrative search system 100. Search system 100 shows a user 102, search engine 104, web content index 106, and search trail processor 108 that generates search trails 110. In one embodiment, search engine 104 is illustratively any commercially available search engine. FIG. 1 also shows that system 100 is connected over network 112 (such as the Internet or World Wide Web) to web content 114 and 116.

Search engine 104 illustratively receives a query 118 from user 102, and searches index 104. The query 118 is also illustratively provided (either through search engine 104, or directly from the user through an appropriate user interface) to search trail processor 108. Search engine 104 illustratively returns organic search results (such as a listing of hyperlinks to documents containing information deemed relevant to query 118), and search trail processor 108 illustratively returns additional sites/domains 120, based not only on query 118, but based on processing of query/interaction logs 122.

Figure 2:
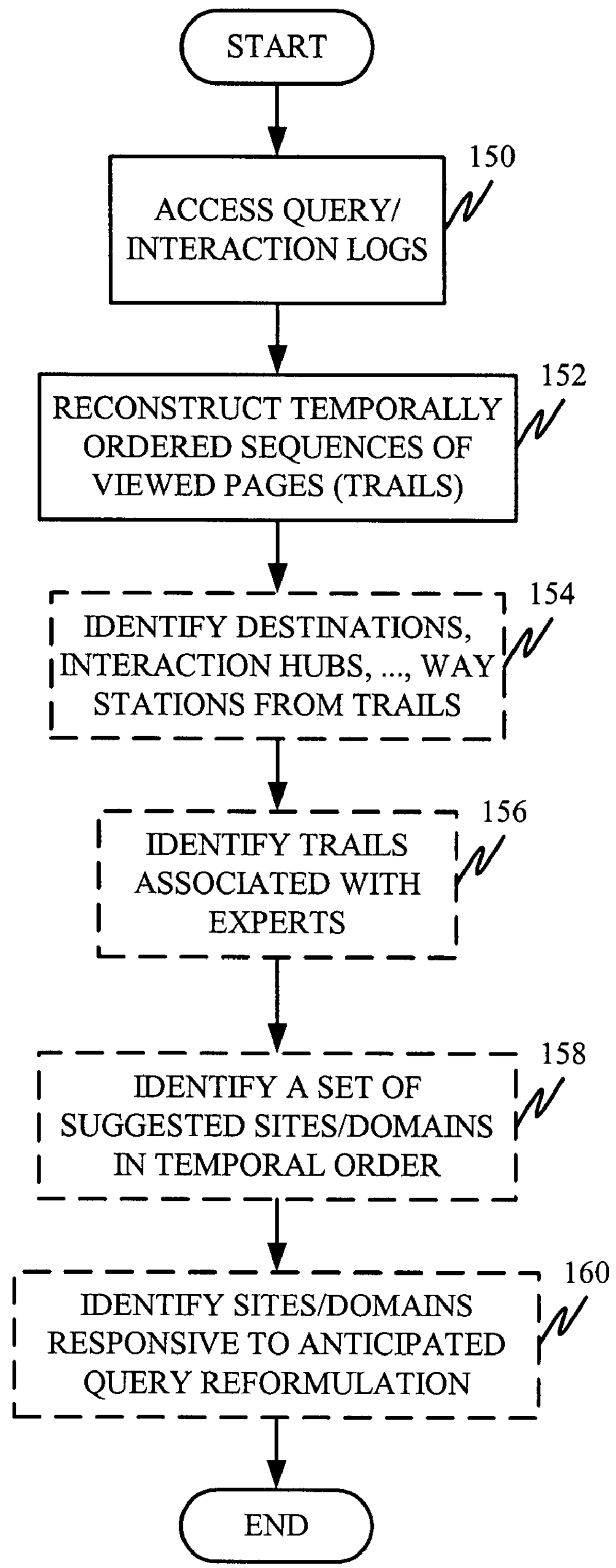
FIG. 2 is a flow diagram illustrating the operation of a portion of the system shown in FIG. 1 in generating session trails and query trails.

FIG. 2 is a flow diagram better illustrating the operation of a portion of system 100 that generates search trails 110. The search trails 110 generated by search trail processor 108 can be pre-computed prior to runtime deployment of the system (or at times when the system is not being used by a user) or it can be computed on-the-fly, once a query 118 is received by user 102. Additionally, of course, some of the search trails 110, and associated information, can be pre-computed, and some of it generated on-the-fly, as desired.

In any case, search trail processor 108 illustratively accesses query/interaction logs 122. This is indicated by block 150 in FIG. 2. The query/interaction logs 122 may illustratively include interaction logs of many users stored by some commercially available toolbar systems, or they can simply be the query and click-through logs of any commercially available search engine. Such logs 122 illustratively include web activity information that contains searching and browsing activity collected from different users over a desired period of time. Each log entry can be formatted and contain various information, as desired. In one embodiment, the log entries in logs 122 include a user identifier (which may be anonymous), a time stamp, a unique browser window identifier, and the uniform resource locator (URL) of a visited web page for that entry. This information is sufficient to reconstruct temporally ordered sequences of viewed pages that are referred to as "trails".

Search trail processor 108 thus reconstructs the temporally ordered sequences of viewed pages (i.e., the trails) from the query/interaction logs 122. This is indicated by block 152 in FIG. 2. Reconstruction and extraction of the trails can be done in a variety of different ways. In one exemplary embodiment, the interaction logs are first grouped based on browser identifier information. Within each browser instance, participant navigation is summarized as a path known as a "browser trail", which extends from the first web page visited, to the last web page visited, in that browser instance. In some of these browser tails, search trails are located. The search trails originate with a query submission to any search engine (such as search engine 104). The web pages visited in these search trails can be statistically accumulated to identify popular destinations given certain queries.

In order to identify the popular destinations, starting with every query submission to a search engine, processor 108 follows the corresponding trail to a point of termination, where it is assumed that a user has completed the information-seeking activity. In one embodiment, the trails include pages that are search result pages, search engine home pages, or pages connected to a search result page through a sequence of clicked hyperlinks. Extracting search trails in this way helps to eliminate ambiguity associated with multitasking, where users run multiple searches concurrently. Since users may open a new browser window for each task, each task has its own browser trail because it is associated with a new browser instance, and it also has a corresponding distinct search trail.

Search trail processor 108 terminates the search trail when a user returns to the user's home page, checks electronic mail, logs into an online service, types a URL, or visits a bookmarked page. Processor 108 also terminates the search trail if a page is viewed by the user for more than thirty minutes with no activity, or where the user closes the active browser window. If a page in the search trail meets any of these criteria, the trail is assumed to terminate on the previous page. Of course, additional or different criteria could be used.

As shown again with respect to FIG. 1, search trail processor 108 identifies two types of search trails 110. Those include session trails 131 and query trails 133. Session trails 131 transcend multiple queries and terminate only when one of the termination criteria discussed above are satisfied. Query trails 133, on the other hand, use the same termination criteria as session trails, but also terminate upon submission of a new query to a search engine. Session trails and query trails can be referred to as interaction paths.

Search trail processor 108 then generates additional information from the session trails 131 and query trails 133. Again, the following information can be generated by search trail processor 108 by pre-computing it, by pre-computing only part of it, or by computing it all during runtime.

In any case, search trail processor 108 may illustratively identify "destinations", "interactions hubs", and "way stations" or other items, from search trails 110. These sites or domains can be provided as additional information 120, along with the organic search results, to assist the user.

Destinations are illustratively web pages or web domains where other users have ended up, following submission of a query (and potentially after traversing multiple queries in-between the initial query and the ultimate destination). Following visits to destinations, a user terminates the search.

Interaction hubs are web pages or web domains that other users interact intensively with following submission of a query. This interaction is typically characterized by viewing pages that the hubs link to, and then returning to the hub and viewing more pages linked from it. Users tend to find some utility in such locations.

Way stations are illustratively web pages or domains that other users pass through on route to other pages or domains. Way stations may contain little or no relevant information to the query, but they may well be required to get to pages that contain such information in an efficient manner. Identifying destinations, interaction hubs and way stations, among other things, is indicated by block 154 in FIG. 2. Hyperlinks to these sites/domains can be provided to the user, along with the organic search results as enhanced results 121.

Figure 4:
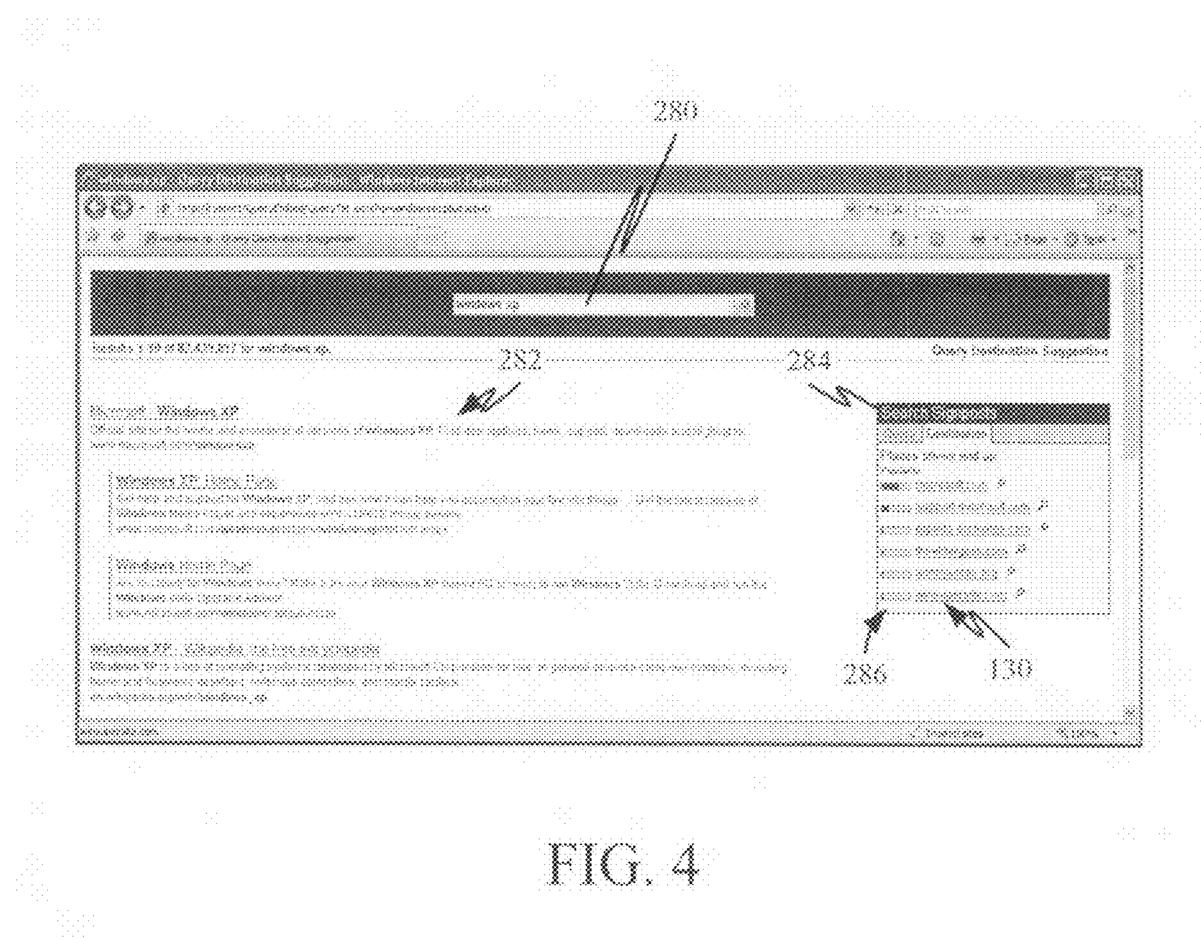
FIG. 4 is one illustrative embodiment of a user interface that can be generated to present the enhanced results to a user.

FIG. 4 shows one exemplary embodiment of a user interface for presenting the combined organic results and additional sites/domains 121. FIG. 4 shows, that in the embodiment illustrated, the query 280 is "Windows XP". The organic search results are indicated generally at 282 and are comprised of a list of hyperlinks along with some metadata (such as summaries or snippets from the linked documents). The additional sites/domains are shown by a user interface display element 284 in FIG. 4. Display element 284 also includes a list of hyperlinks that are preceded by a statement such as "Places others end up:". Those illustrated in display element 284 are destinations 130. The destinations 130 are also shown with a popularity indicator 286. The popularity indicator shown in FIG. 4 is a popularity bar which has a shaded portion indicating the relative number of users that ended up at the particular destination 130 adjacent which the popularity indicator 286 is displayed. Alternatively, of course, the popularity indicator 286 could be a percentage. In that case, the destination 130 may be presented along with a statement such as "forty percent of users who typed [the query 280] ended up at [this destination]", where "the query" is replaced by the actual query entered by the user 102, and "this destination" is replaced by the hyperlink to the destination identified by processor 108, given the query.

Search trail processor 108 illustratively identifies trails 130 or 132 that are associated with experts. This is indicated by optional block 156 in FIG. 2. For example, it may be desirable to have search trail processor 108 present the user with additional sites 120 that are provided to augment the organic search results provided by search engine 104, and that represent pages and domains that are popular among experts in the technology or subject matter area being searched. In order to identify these types of pages, search trail processor 108 illustratively identifies whether the person visiting the page in the query/interaction logs 122 is an expert. Experts can be identified in any desired way. For instance, in one embodiment, experts are self-identified in their on-line profiles. In another embodiment, experts are identified based on the types of queries that they submit to the search engine. For instance, where a user submits a query that is formulated in a sophisticated manner (such as by using quote marks, a plus sign, or any other more sophisticated operators) this is an indication that the user has achieved at least some level of expertise in searching (i.e., the user has search engine expertise) that is above average. Therefore, that person may be identified by processor 108 as an expert.

In another embodiment, a user may be identified as having domain expertise based on how often this particular user looks at information on a particular topic. For example, a user that frequently submits many queries on "physics", "astronomy", and "space" is likely to be more informed about the best places to visit for searches in that subject matter area than an average person.

The interaction patterns of all users searching for a given topic, and identified by interaction logs 122, may overwhelm the interactions performed by experts in the area. Therefore, search trail processor 108, in returning the additional sites 120, may weight those visited by experts more heavily than others. Of course, other filtering techniques can be used to filter the destinations based on user expertise so that the user 102 can see which destinations are popular and useful to people with domain expertise.

Search trail processor 108 may also identify a set of suggested sites or domains in temporal order, that can be provided to the user. This is indicated by block 158 in FIG. 2. For instance, for an information query where a broad understanding of a topic may be required, it may be beneficial to users to present not only recommendations about the individual domains that they should visit, but also to recommend a series of domains and an order in which they should be visited (to maximize topic coverage and learnability, for instance). Such an ordered set of pages or domains can provide the user with exposure to key concepts for a given topic (which may be specified, if even partly, in the query) from numerous information sources.

There are a wide variety of ways which the user can be walked through such an ordered set of pages or domains. For instance, following submission of the query by the user, and after receiving an indication that the user desires to follow the ordered set of pages, the user can be provided with a combo box that displays the ordered pages or domains, and also provides navigation options. This may be provided as a plug-in component, or otherwise. Similarly, the user can be provided with a frame launchable from the search result page that offers similar functionality without the need to have a toolbar installed. In any case, the set of ordered sites or domains can be identified by search trail processor 108.

It may also happen that a user mis-types the query. Some current approaches to correcting spelling mistakes in a query involve the presentation of query refinements, usually in the form "did you mean [blank]" where a reformulated query is inserted in place of [blank]. In such current systems, the user is then required to click on the reformulated query, and that query is then launched against the index or web content. This type of system has a number of problems. For instance, if the query that the user actually submitted is a valid query, then the spelling correction system will not be deployed, and the user will be presented with a list of seemingly irrelevant results (although they may be relevant to the actual query submitted by the user).

In contrast, in one embodiment, system 100 does not require the user to discover that the query has been mistyped. Instead, by processor 108 processing the query/interaction logs 122, processor 108 can identify the pages or domains that others have visited following the subsequent correction of the query. For instance, processor 108 may determine that, given the query, the user is likely to reformulate it to another query, and then to visit a page or domain returned as a result from launching the reformulated query. Instead of requiring the user to go through all of these steps, processor 108 simply identifies the sites or domains responsive to the anticipated query reformulation and returns those to the user automatically. This is indicated by block 160 in FIG. 2.

An example may be helpful. Assume that the input query is "acys". This happens to be a valid query, in that it signifies a term which is sometimes used to search for a site, but the site is not very popular. In fact, most users refine that query to "macys" and visit "macys.com". Instead of asking the user to confirm that the user meant to type "macys", processor 108 simply presents the additional sites/domains provided along with the enhanced results 119 "macys.com" as well as some indication that the input query has been reformulated to "macys" to yield this result. This has great potential to speed up user searching and improve user satisfaction. It will be noted that processor 108 does not require a user to relaunch a reformulated query, but simply anticipates that the user, if given the opportunity, would in fact reformulate the query and launch it. Therefore, processor 108 simply returns the results to the anticipated reformulation of the query, saving the user time.

It should be noted that all of these items of information generated by search trail processor 108 can be computed beforehand, or during runtime once the user has input a runtime query, or a combination of both.

Figure 3:
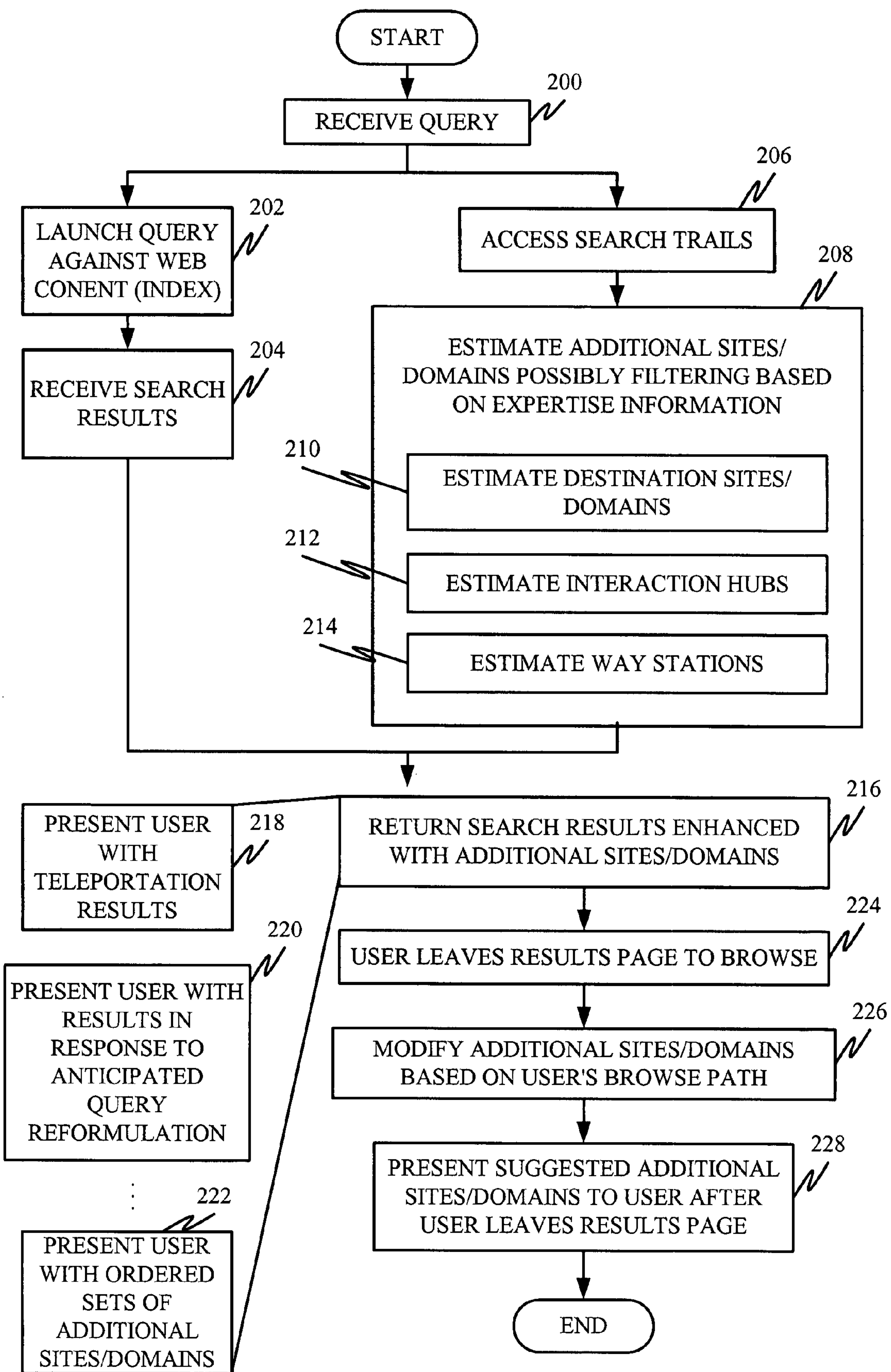
FIG. 3 is a flow diagram illustrating the operation of a portion of the system shown in FIG. 1 in generating enhanced results based on an input query.

FIG. 3 is a flow diagram illustrating one embodiment of the operation of system 100 during runtime. System 100 first receives query 118 from user 102. This is indicated by block 200 in FIG. 3. System 100 then performs two different processes. They can be performed sequentially, or in parallel. The embodiment shown in FIG. 3 illustrates them being in parallel, although the invention is not to be limited to this. In accordance with one of the processes, search engine 104 receives query 118 and simply launches the query against web content index 106 and web content 114-116. This is indicated by block 202 in FIG. 3. Search engine 104 then receives the search results which are illustratively a list of hyperlinks to documents or other web content identified as relevant to query 118. Of course, additional metadata can be provided along with the hyperlinks as well, as desired. As described above, these are referred to as the "organic search results". Receiving the search results at search engine 104 is indicated by block 204 in FIG. 3. Before the search results are returned to user 102, search trail processor 108 also receives query 118 input by user 102 and accesses the search trails 110 which have been identified from the query/interaction logs 122. Accessing the search trails is indicated by block 206 in FIG. 3.

Search trail processor 108 then estimates additional sites or domains, in addition to the search results generated by search engine 104, and possibly filters them based on the expertise information described above with respect to block 156 in FIG. 2. This is indicated by block 208 in FIG. 3. In one embodiment, processor 108 estimates destination sites or domains 130, interaction hubs 132, and way stations 134 (described above with respect to block 154 in FIG. 2). Estimating these sites or domains is indicated by blocks 210, 212, and 214, respectively, in FIG. 3.

Estimation of these sites and domains can be performed in a wide variety of different ways. In one illustrative embodiment, a term-based site/domain prediction model is used. In accordance with the exemplary discussion herein, a prediction model for predicting destinations 130 will be described, although a similar model could be generated for interaction hubs 132 and way stations 134 as well.

As discussed above, two types of destinations are first extracted. One is a destination for a query trail, and the other is a destination for a session trail. These are referred to as query destinations and session destinations, respectively. For both destination types, a corpus of query-destination pairs is obtained and used to construct term-vector representations of destinations that are analogous to the known tf.idf (term frequency.inverse document frequency) document representation in conventional information retrieval systems. Then, given a new query q consisting of k terms $t_1 \ldots t_k$, we identify highest-scoring destinations using the following similarity function:

$$S(d, q) = \sum_{i=1:k} w_q(t_i) w_d(t_i) \quad \text{Eq. 1}$$

where query and destination term weights, $w_q(t_i)$ and $w_d(t_i)$, are computed using standard tf.idf weighting and query and user session-normalized smoothed tf.idf weighting, respectively.

Of course, other scoring functions could be used as well. In any case, given the query, the destinations 210, interaction hubs 212 and way stations 214 are estimated. Processor 108 and search engine 104, then return the organic search results enhanced with the additional sites or domains 120 (collectively referred to as 121 in FIG. 1) to user 102. This is indicated by block 216 in FIG. 3.

The organic search results, enhanced with the additional sites or domains, can be used in a plurality of different ways, three examples of which are shown in FIG. 3. A first example is presenting the user with what are referred to as teleportation results. This is indicated by block 218 in FIG. 3. The organic web search results mentioned above link to content for which there is a topical match with the query input by the user. However, it may also be of interest (and of use to the user who input the query) to be presented with pages or domains with which many users searching for information on this topic interact.

For instance, assume that a user has input a query “dogs” but ends up navigating through a series of web pages to a destination “petfoods.com”. The page which the user eventually settled on may not even be topically relevant to the query. The presentation of such popular locations provides a mechanism through which users can be taken to places of interest (web pages or domains of interest) to other users, potentially bypassing pages that lie in between. Navigating all the pages in between may be a time consuming burden to the user. Therefore, the presentation of such pages can effectively transport the user several steps into the future along the query trail (or session trail) identified by processor 108. This can save users time in terms of subsequent query reformulations or browsing through pages to find desired hyperlinks.

In accordance with one embodiment, a user can control how far into the future they are transported along the prior query trail (or session trail) identified by search trail processor 108. For instance, the user may be presented with links to pages that were navigated to by prior users, immediately before the prior users launched a next query. Similarly, the user may be presented with pages that were navigated to from a next search result or that were navigated to immediately before the end of a prior search session in the session trail identified by processor 108. In any case, presenting the user with page or domain destinations that were navigated to by prior users who entered a similar query is indicated by presenting the user with teleportation results 218 in FIG. 3.

Search trail processor 108 can also present the user with results in response to anticipated query reformulation. This is indicated by block 220 in FIG. 3. This was discussed in some detail above with respect to block 160 in FIG. 2. That discussion was directed to search trail processor 108 identifying the sites or domains responsive to anticipated query reformulation, and block 220 is directed to presenting the user with those results (sites or domains) in a format similar to that shown in FIG. 4. Of course processor 108 can present the results to the user in different ways as well.

A third presentation of enhanced results to the user is indicated by block 222 in FIG. 3. The user can be presented with ordered sets of additional sites or domains derived from the session trails 130 or query trails 132 accessed by search trail processor 108 in response to the query 118 input by user 102. Again, this is discussed in some detail above with respect to block 158 in FIG. 2. In the instance in which those ordered sets of additional sites or domains are presented to the user, they can be presented in a format similar to that shown in FIG. 4, or in a different way as well.

It will be noted of course that processor 108 can provide a wide variety of different suggested additional sites or domains to the user, and those listed with respect to FIGS. 2 and 3 are exemplary only.

Once the organic search results, enhanced with the additional sites/domains 121 are presented to user 102 (as indicated by block 216 in FIG. 3) the user can navigate to any of the organic results or additional sites/domains. In one embodiment, even after the user leaves the results page to browse either the organic results or the additional sites/domains, processor 108 modifies the additional sites/domains based on the user’s browse path through the enhanced results 121 provided to user 102. The user leaving the results page is indicated by block 224 in FIG. 3, and processor 108 modifying the additional sites/domains based on the user’s browse paths is indicated by block 226 in FIG. 3.

Based on the user’s browse path, search trail processor 108 can present different (or the same) suggested additional sites/domains to the user after the user leaves the result page. This is indicated by block 228 in FIG. 3. More specifically, during exploratory tasks, it has been found that many users are required to visit many pages to find sufficient information, and such users may find it beneficial if the recommendations of the additional sites/domains provided as part of results 121 were displayed on every page viewed, and not just the result page. Therefore, in one embodiment, search trail processor 108 (or a downloadable plug-in or application) is configured to display either the original additional site/domains 120 (which were originally displayed as part of results 121) to the user, even after the user navigates away from the original results page. Alternatively, the additional sites/domains 120 suggested by system 100 can change dynamically based on the user’s browse path, and based on other information, such as the intersection with other users’ browse paths who navigated to the web page currently being viewed by the user.

In any case, in one embodiment, the additional sites/domains 120, such as destinations 130, interaction hubs 132 and way stations 134 (whether they be the original additional sites/domains 120 presented as part of results 121, or dynamically changing additional sites/domains 120) can be offered to the user in a small semi-transparent overlay on the page then being viewed by the user. It may be desirable to provide this overlay on the top right-hand corner of the web page, for instance, because that is a location that is typically devoid of substantive page content. However, other places on the display could just as easily be used. The additional sites/domains 120 presented to the user in this way may illustratively point users to places (web sites or domains) where others who visited the domain currently being visited by the current user, ended up, interacted with extensively, or simply passed through. Of course, it will be noted that modifying the sites/domains and presenting them to the user even after the user leaves the results page need not be performed.

Figure 5:
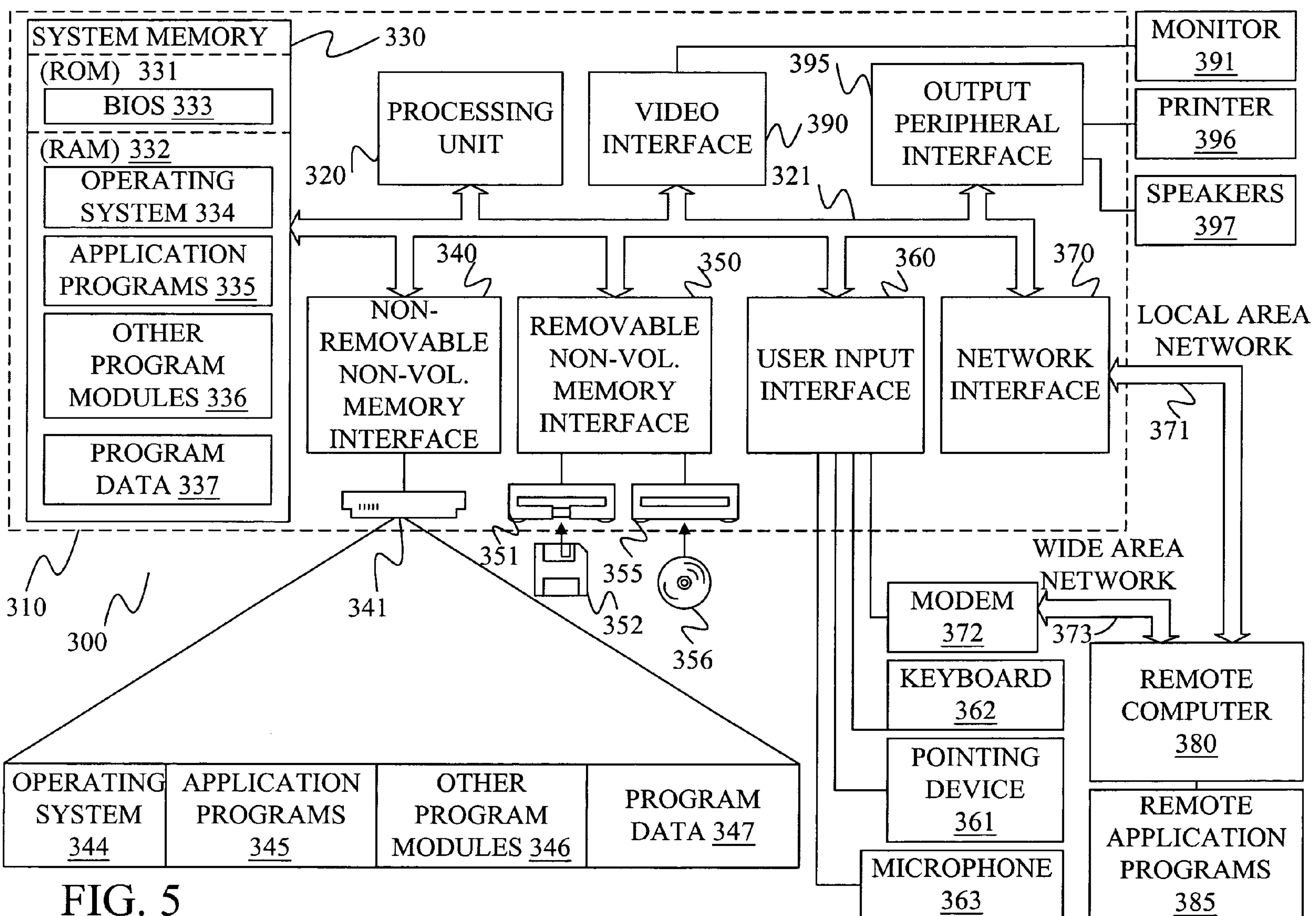
FIG. 5 is a block diagram of one exemplary embodiment of a computing environment in which the system shown in FIG. 1 can be used.

FIG. 5 illustrates an example of a suitable computing system environment 300 on which embodiments may be implemented. The computing system environment 300 is only one example of a suitable computing environment and is not intended to suggest any limitation as to the scope of use or functionality of the claimed subject matter. Neither should the computing environment 300 be interpreted as having any dependency or requirement relating to any one or combination of components illustrated in the exemplary operating environment 300.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 5 illustrates operating system 334, application programs 335, other program modules 336, and program data 337. System 100 can reside in any desirable place, such as other program modules 336, or elsewhere.

The computer 310 may also include other removable/non-removable volatile/nonvolatile computer storage media. By way of example only, FIG. 5 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 5, provide storage of computer readable instructions, data structures, program modules and other data for the computer 310. In FIG. 5, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 5 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 5 illustrates remote application programs 385 as residing on remote computer 380. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of performing searching of information, given an information retrieval query submitted by a current user, the method comprising:

executing the information retrieval query to obtain information retrieval search results for the information retrieval query;

automatically searching stored search trails of prior users in response to receiving the information retrieval query, the search trails indicating one or more interaction paths followed by the prior users, the interaction paths each comprising a temporally ordered sequence of viewed web pages beginning with search results returned to the prior users in response to submitting the information retrieval query wherein the interaction paths searched include a query reformulation path in which the prior users reformulated the information retrieval query and accessed sites or domains returned in response to a search performed for the reformulated information retrieval query;

identifying sites or domains in the information retrieval search results and additional sites or domains, in addition to those in the information retrieval search results, from the search trails accessed wherein identifying the additional sites and domains includes identifying the additional sites or domains based on the sites or domains accessed by the prior users on the interaction paths after reformulating the information retrieval query, the additional sites or domains being displayed on the user interface before the current user reformulates the information retrieval query; and generating a user interface displaying a search results page with both the sites or domains in the information retrieval search results for the information retrieval query and links to the additional sites or domains.

2. The method of claim 1 wherein identifying additional sites or domains comprises:

identifying destination sites or domains from the search trails, the destination sites or domains being ultimate sites or domains accessed by the prior users while following one of the interaction paths.

3. The method of claim 1 wherein identifying additional sites or domains comprises:

identifying interaction hub sites or domains from the search trails, the interaction hub sites or domains being sites or domains that the prior users visited a high number of times while following the interaction paths, relative to other sites or domains on the interaction paths.

4. The method of claim 1 wherein identifying additional sites or domains comprises:

identifying way station sites or domains from the search trails, the way station sites or domains being sites or domains the prior users passed through along the interaction paths.

5. The method of claim 1 wherein identifying additional sites or domains comprises:

identifying additional sites or domains visited by prior users having predefined expertise, based on the search trails accessed.

6. The method of claim 5 wherein generating a user interface comprises:

generating an indication on the user interface which additional sites or domains were visited by prior users having the predefined expertise.

7. The method of claim 1 wherein identifying additional sites or domains comprises:

identifying an ordered set of additional sites or domains, in an order accessed by the prior users along the interaction paths.

8. The method of claim 1 and further comprising:

generating a user interface displaying links to additional sites and domains after the current user navigates away from the results page.

9. The method of claim 8 wherein generating a user interface displaying links to additional sites and domains after the current user navigates away from the results page, comprises:

modifying the links to the additional sites and domains after the current user navigates away from the results page, based on a navigation path taken by the current user after navigating away from the results page, and generating a user interface displaying the modified links.

10. The method of claim 1 wherein identifying additional sites or domains comprises:

identifying the additional sites or domains as those sites or domains navigated to by the prior users at a predetermined distance along the interaction paths of the prior users.

11. The method of claim 10 and further comprising:

receiving a user input indicative of the predetermined distance selected by the current user.

12. A system for generating a response to a user query, the system comprising:

a search engine receiving the user query and executing the user query to obtain search results for the query;

a corpus of interaction data indicative of interaction paths followed by prior users given prior queries wherein the interaction paths include a query reformulation path in which the prior users reformulated the user query and accessed sites or domains returned in response to a search performed for the reformulated user query;

a search trail processor identifying additional sites or domains in addition to the search results, in the corpus, visited by the prior users given prior queries that are related to the user query, the search trail processor further identifying which of the additional sites or domains identified comprise hubs that the prior user viewed in the interaction path, each hub comprising a page from which the prior user viewed a plurality of different pages, linked directly to the hub, and then returned to the hub, wherein the additional sites or domains are generated by identifying the additional sites or domains based on the sites or domains accessed by the prior users on the interaction paths after reformulating the user query, the additional sites or domains being displayed on a user interface before the current user reformulates the user query; and a user interface generation component generating a user interface indicative of both the search results and the additional sites or domains, and indicative of which of the additional sites or domains comprise hubs.

13. The system of claim 12 wherein the search trail processor identifies session trails and search trails in the corpus of interaction data.

14. The system of claim 13 wherein the search trail processor identifies the session trails and search trails prior to receiving the user query.

15. The system of claim 14 wherein the search trail processor searches the session trails and the search trails after receiving the user query.

16. The system of claim 12 wherein the user interface generation component generates a user interface popularity indicator indicative of the popularity of each additional site or domain.

* * * * *